Feb. 3, 1931.    J. H. HOLDEN ET AL    1,790,748
METHOD OF PURIFYING AND RECOVERING OIL FROM WATER-IN-OIL MIXTURE
Filed June 15, 1926

Inventors:
JAMES H. HOLDEN and
JOSHUA C. WHETZEL.
their Attorney.

Patented Feb. 3, 1931

1,790,748

UNITED STATES PATENT OFFICE

JAMES H. HOLDEN, OF BRENTWOOD, AND JOSHUA C. WHETZEL, OF PITTSBURGH, PENNSYLVANIA, ASSIGNORS TO AMERICAN SHEET AND TIN PLATE COMPANY, OF PITTSBURGH, PENNSYLVANIA, A CORPORATION OF NEW JERSEY

METHOD OF PURIFYING AND RECOVERING OIL FROM WATER-IN-OIL MIXTURE

Application filed June 15, 1926. Serial No. 116,129.

This invention relates to a method of purifying and drying oil separated from an emulsion of oil and water, and while not limited thereto, relates more particularly to a method of purifying and drying oil separated from an emulsion of oil and water formed by washing tin plate after it passes from the tinning pots.

The oil washed from tin plate is emulsified, forming an oil-in-water emulsion consisting of approximately two per cent. oil and ninety-eight per cent. water, more or less, depending upon the quantity of oil on the tin plate, and this oil must be separted from the water in order to make the washing fluid fit for dumping or discharge into the sewers, so as to prevent the contamination of the streams and also to prevent the stoppage of the sewer system.

This oil is separated from a large portion of the water by breaking down the oil-in-water emulsion and then permitting the oil to separate out of the broken emulsion by gravity, as hereinafter described.

The oil, during the gravity separation, will rise up to the top of the body of broken emulsion and during its travel up through the broken emulsion will take up a considerable amount of water, so as to form what is, in effect, a water-in-oil mixture, containing approximately sixty per cent. water. Considerable impurities will also be contained in this water-in-oil-mixture, which impurities must be removed from the oil in order to make the oil fit for reuse in a tin pot.

The present invention relates particularly to a novel method of and mechanism for removing this sixty per cent. of water and foreign matter from the water-in-oil mixture.

The figure shows a diagrammatic sectional side elevation of the apparatus used in carrying out the steps of the novel method of this application.

The oil in water emulsion or washer effluent, from which the wet oil or water-in-oil mixture to be treated by the method of the present invention is separated, is discharged through a pipe 2 into a trough 3, from which it flows through a pipe 4 to the heating and mixing chamber 5 of a treatment-tank D.

The tank D is divided by transverse walls 6 and 7 into the heating and mixing chamber 5, a separating chamber 8 and an oil receiving chamber or sump 9. A steam-line 10 extends into the tank D, and has one branch 11 extending onto and forming a coil 12 on the inclined top face of the wall 7, thence over and into the mixing and heating chamber 5, as at 13, where it terminates and supplies live steam to the emulsion therein to heat and agitate the emulsion. Another branch 14 of the steam-line 10 extends down into the oil chamber or sump 9 where it terminates in a heating coil 15.

An acid-tank 16 containing sulfuric acid is provided above the tank D, and a pump 17 is provided for delivering measured quantities of the acid through a conduit 18 to the heating and mixing chamber 5 of the tank D.

The treatment-tank D serves two purposes. It makes the major portion of the water content of the emulsion fit for dumping, thus avoiding trouble from stoppage of sewers and contamination of streams by the oil. It also permits the separation of the oil from the major portion of the water of the emulsion. The treatment of the emulsion in the tank D is continuous with a constant discharge of substantially oil-free water.

The emulsion entering the tank D has approximately the following composition—

|  | Per cent |
|---|---|
| Sodium carbonate | 0.2 |
| Palm oil | 2.1 |
| Water | 97.7 |

The overflow or water discharged from the tank D contains little or no oil, approximately 0.3 per cent. sodium sulfate, and approximately 0.1 per cent. free sulfuric acid. The oil separated out of the emulsion in the tank D contains about 60 per cent. water which is later removed and is, in effect, a water-in-oil mixture. Experience has shown that it is easily possible to recover from 98 to 99 per cent. of the oil from the emulsion entering the tank D.

As the emulsion flows into the chamber 5 of the treatment-tank D, a small quantity of sulfuric acid from the tank 16 flows through the conduit 18 and mixes with the emulsion. The quantity of sulfuric acid entering the emulsion in the chamber 5 is regulated so as to provide a concentration of approximately 0.1 per cent. in the water separated out of the emulsion in the separating chamber 8. Live steam is delivered into the mixture of acid and emulsion in the chamber 5, from the pipe 13 which heats the mixture and accelerates the reaction, and also serves to thoroughly mix the emulsion and acid. The reaction of the acid and emulsion is favored by high temperature and good agitation. A temperature of 140 degrees Fahrenheit is generally maintained in the chamber 5. The effect of the acid is to break down the emulsion so that the water and oil may be readily separated. The quantity of emulsion and acid mixture builds up in the chamber 5 and flows over the wall 6 into the separating-chamber 8 where it is allowed to separate by gravity, the oil rising and the water settling and being discharged through a standpipe 19 arranged to maintain a water level closely adjacent the top of the wall 7 so that the oil rising to the top of the water will flow over the wall 7 into the oil chamber or sump 9. Experience has shown that a water level approximately 1½ inches below the top of the wall 7 is satisfactory.

The oil which rises to the surface in the separating chamber 8 picks up a quantity of water and gradually builds up as a frothy mixture which, as stated, before, is in effect a water-in-oil mixture and after reaching a few inches in thickness overflows into the oil chamber or sump 9. This flow is aided by the application of heat from the coil 12 on the top of the wall 7. The oil-chamber or sump 9 is of sufficient capacity to permit a considerable accumulation of oil, and it is not necessary that the subsequent operations be carried on continuously, although it is entirely possible to make the entire process continuous.

The results obtained by breaking down the oil-in-water emulsion with sulfuric acid and separating the oil from the water of the emulsion as a water-in-oil mixture may be accomplished by a number of other means, but probably less efficiently. The treatment of the emulsion may be carried on entirely as a batch proposition, without continuous separation; also other more complicated methods might be used. Materials other than sulfuric acid may be used to break the emulsion. Experience has shown so far that commercial sulfuric acid of 60 degrees Baumé strength is the most economical to use. However, almost any other acid or acid mixture, such as weak pickle liquor, may be used as reagents to break the emulsion.

In addition to the chemical treatment methods for breaking the emulsion described above, the emulsion may be broken by mechanical means such as centrifuging or by the use of solvents. These possibilities are mentioned to indicate the general scope of this invention.

When centrifuging is used to break the emulsion, it is substituted for the mixing chamber 5 and advantage is taken of the difference in specific gravity of the oil and water contents of the emulsion, and by centrifuging at very high speeds, known as supercentrifuging, the water is thrown out of the mixture so as to permit the finely divided oil particles to combine and form a sufficient body to rise to the top of the water when the centrifuging is stopped, as a water-in-oil mixture.

When a solvent is used to break down the emulsion, one is selected which will combine with and be readily removable from the oil; or a substance is selected which will combine with the water and will not affect the oil.

Hydrocarbon solvents, such as benzol, when thoroughly mixed with the emulsion, will break down the emulsion and combine with the oil content as it rises to the top of the separating chamber 8 in the form of a water-in-oil mixture. The hydrocarbon solvent may either be separated from the water-in-oil mixture by vaporizing it at the same time as the water content of the mixture is vaporized, as hereinafter described, or it may be separated in a separate operation. In either case, it is desirable to recover the solvent by condensing its vapors in any well known manner.

Other substances, such as sodium sulfate or niter cake, may be used to break down the emulsion by mixing said substances in the emulsion. These substances will combine with the water as the emulsion is broken and will liberate the oil content which will rise to the surface of the chamber 8 as a water-in-oil mixture.

The above solvents may be mixed with the emulsion in the tank 5 by the addition of steam from the pipe 13 in the same manner as the acid is mixed with the emulsion.

After the water-in-oil mixture has collected in the chamber or sump 9, it is pumped out through a conduit or pipe 20 by a pump 21 and discharged onto a screen 22.

The water-in-oil mixture flows through the screen 22 while the large particles of tin or other foreign matter remain on the screen. The water-in-oil mixture which flows through the screen is collected in a vat 23 having a steam coil 24 therein. A pipe 25 leads from the vat 23 to a pump 26 which draws the mixture from the vat 23 and forces it through a coil 27 in a heating drum 28 where the water content is vaporized. The coil 27 discharges the heated liquid oil and water vapor into the lower end of a stack 29 where the liquid oil and water vapors are separated. Steam is supplied to the drum 28 through an inlet pipe 30 at approximately one-hundred-forty pounds per square inch pressure, and flows from the drum through a pipe 31 to a steam trap or the like (not shown.)

The oil separated from the water vapors in the stack 29 flows into the storage vats or tanks 32 and 33, which are provided with steam coils to maintain the oil at approximately three-hundred degrees Fahrenheit. The heated oil from the tanks 32 and 33 is adapted to be passed through a pipe 34 to a standard form of centrifuge 35 and have the fine remaining solid foreign matter separated therefrom. The finally purified oil is then discharged into a tank or vat 36 and is ready for reuse on other tin plate.

The water-in-oil mixture pumped from the sump 9 contains approximately sixty per cent water, some sulfate picked up in the treatment tank D, and incidental dirt and foreign matter picked up at various stages in the process, which are removed more or less completely in the following steps.

As the water-in-oil mixture is discharged on the screen 22, any large particles of foreign matter are removed. The screened mixture is then collected in the vat 23 and preheated by the steam coil 24. The preheated water-in-oil mixture is pumped from the vat 23 and forced through the coil 27 in the heating drum 28 where it is heated to approximately three-hundred degrees Fahrenheit.

Higher or even lower temperatures may be used if desired, or the coil 27 may be heated directly by free flame in an open furnace. However, experience has indicated that much more trouble may be expected in obtaining uniformity of operations if an open flame is used.

The water content of the water-in-oil mixture is vaporized in the passage of the oil through the coil 27 and the water vapor and oil are separated when the mixture is blown or forced into the stack 29. The vapor will be carried up through the stack by the stack-draft, while the dried oil will run down through the stack and be collected in the tank or vat 32. Baffles and additional heat may be used in the stack if desired or necessary. By a proper control of temperature, air flow and wet oil pumping, the water passes up the stack 29 as steam or vapor, and only a trace or less than 0.1 per cent. of water remains in the oil. Experience has shown that the whole operation may be controlled by the temperature at the exit end of the drier-coil 27. If this temperature is maintained at 300 degrees Fahrenheit or above and there is a proper flow of air through the stack 29, the water will be removed practically completely.

The dried oil is passed from the tank or vat 33 through the high speed centrifuge 35. The centrifuge 35 serves to throw out a considerable proportion of the ash forming and other foreign matter from the oil as a sludge, and lowers the viscosity of the dried oil to approximately the same value as when it left the tin pot. The oil discharged from the centrifuge contains a much smaller amount of chlorid and probably less ash and other foreign matter in general than the oil removed from the tin plates.

The dried oil is fed to the centrifuge 35 at a high temperature for efficient sludge removal. This sludge removal is favored by a small rate of flow through the centrifuge and a high oil temperature. A temperature of approximately 300 degrees Fahrenheit and a flow of forty gallons per hour has been found to be effective.

In addition to the purification of the tin pot oil taking place in the centrifuge 35, a valuable by-product is obtained in the form of the sludge removed from the oil, which is deposited in the bowl of the centrifuge and recovered. This sludge is removed from the centrifuge and taken to the scruff furnace of the mill where the tin content is recovered as a tin-bearing ash, and the value of the tin thus recovered is sufficient to cover a large proportion of the expense chargeable to this oil treating process.

From the above, it will be readily understood that we have developed a complete process whereby the oil is recovered from the emulsion resulting from washing tin plate, with a minimum of expense and labor.

While we have shown and described certain specific apparatus used to carry out our process together with specific steps, it will be understood that we do not wish to be limited to these details, since various other forms of apparatus may be used to carry out the steps of our novel method, and various modifications in the method steps may be made, such as changes in temperatures, rates of flow, and the like without in any way departing from the scope of our invention as defined in the appended claims.

We claim:

1. In a method of purifying and recovering dry palm oil from a water-in-palm oil mixture separated from a palm oil-in-water emulsion formed by washing palm oil from tin plate after it passes from the tinning pot, the step consisting of heating the water in palm oil mixture until substantially all of the water content of the mixture is vaporized, and then delivering the mixture of oil and vapor resulting from said heating step into a draft of air of sufficient velocity to carry away the vapor and of insufficient velocity to pick up the oil, whereby said oil and vapor will be separated.

2. A method of purifying and recovering dry palm oil from a water-in-palm oil mixture separated from a palm oil-in-water emulsion formed by washing palm oil from tin plate after it passes from the tinning pot, consisting of screening the water-in-oil mixture to remove relatively large particles of foreign matter, heating the water-in-oil mixture until substantially all of the water content of the mixture is vaporized, then delivering the mixture of oil and water vapor resulting from said heating step into an up-flowing draft of air of sufficient velocity to carry away the vapor and of insufficient velocity to pick up the oil, said oil falling by gravity through said draft of air, collecting said oil and retaining it in its heated state, and then centrifuging said heated oil to remove any fine remaining solid foreign matter therefrom in the form of a sludge.

3. A method of purifying and recovering dry palm oil from a water-in-palm oil mixture separated from a palm oil-in-water emulsion formed by washing palm oil from tin plate after it passes from the tinning pot, consisting of screening the water-in-oil mixture to remove relatively large particles of foreign matter, heating the water-in-oil mixture to approximately three hundred degrees Fahrenheit so as to vaporize substantially all of the water content of the mixture, then delivering the mixture of oil and water vapor resulting from said heating step into an up-flowing draft of air of sufficient velocity to carry away the water vapor and of insufficient velocity to pick up the oil, said oil falling by gravity through said draft of air, collecting said oil and retaining it in its heated state, and then removing any fine remaining solid foreign matter from said oil.

4. In a method of purifying and recovering dry palm oil from a water-in-palm oil mixture resulting from acid demulsification and separation of a palm oil-in-water emulsion formed by washing palm oil from tin plate after it passes from the tinning pot, the steps consisting of heating the water in palm oil mixture until substantially all of the water content of the mixture is vaporized, and then delivering the mixture of oil and vapor resulting from said heating step into a draft of air of sufficient velocity to carry away the vapor and of insufficient velocity to pick up the oil, whereby said oil and vapor will be separated.

5. A method of purifying and recovering dry palm oil from a water-in-palm oil mixture resulting from acid demulsification and separation of a palm oil-in-water emulsion formed by washing palm oil from tin plate after it passes from the tinning pot, consisting of screening the water-in-oil mixture to remove relatively large particles of foreign matter, heating the water-in-oil mixture until substantially all of the water content of the mixture is vaporized, then delivering the mixture of oil and water vapor resulting from said heating step into an up-flowing draft of air of sufficient velocity to carry away the vapor and of insufficient velocity to pick up the oil, said oil falling by gravity through said draft of air, collecting said oil and retaining it in its heated state, and then centrifuging said heated oil to remove any fine remaining solid foreign matter therefrom in the form of a sludge.

6. A method of purifying and recovering dry palm oil from a water-in-palm oil mixture resulting from acid demulsification and separation of a palm oil-in-water emulsion formed by washing palm oil from tin plate after it passes from the tinning pot, consisting of screening the water-in-oil mixture to remove relatively large particles of foreign matter, heating the water-in-oil mixture to approximately three-hundred degrees Fahrenheit so as to vaporize substantially all of the water content of the mixture, then delivering the mixture of oil and water vapor resulting from said heating step into an up-flowing draft of air of sufficient velocity to carry away the water vapor and of insufficient velocity to pick up the oil, and oil falling by gravity through said draft of air, collecting said oil and retaining it in its heated state, and then removing any fine remaining solid foreign matter from said oil.

In testimony whereof, we have hereunto set our hands.

JAMES H. HOLDEN.
JOSHUA C. WHETZEL.